United States Patent
Cheung

(10) Patent No.: US 10,522,295 B2
(45) Date of Patent: Dec. 31, 2019

(54) SYSTEM AND METHOD FOR ELECTRET SURFACE POTENTIAL RESTORATION BY A DIRECTIONAL PULSATING ELECTRIC FIELD

(71) Applicant: ADC Tech International Ltd., Kwun Tong Kowloon (HK)

(72) Inventor: William S. H. Cheung, London (GB)

(73) Assignee: ADC TECH INTERNATIONAL LTD. (HK)

( * ) Notice: Subject to any disclaimer, the term of this patent is extended or adjusted under 35 U.S.C. 154(b) by 197 days.

(21) Appl. No.: 15/839,176

(22) Filed: Dec. 12, 2017

(65) Prior Publication Data

US 2018/0102221 A1 Apr. 12, 2018

Related U.S. Application Data

(62) Division of application No. 14/337,602, filed on Jul. 22, 2014, now Pat. No. 9,842,701.

(60) Provisional application No. 61/857,125, filed on Jul. 22, 2013.

(51) Int. Cl.
  *H01G 7/02* (2006.01)
  *H02M 11/00* (2006.01)

(52) U.S. Cl.
  CPC .............. *H01G 7/02* (2013.01); *H02M 11/00* (2013.01)

(58) Field of Classification Search
  CPC .................................. H01G 7/02; H02M 11/00
  USPC ......................................................... 307/400
  See application file for complete search history.

(56) References Cited

U.S. PATENT DOCUMENTS

| | | |
|---|---|---|
| 3,514,393 A | 5/1970 | Eisby |
| 3,668,690 A | 6/1972 | Ormond |
| 3,736,494 A | 5/1973 | Rasenthal |
| 3,886,406 A | 5/1975 | Anderson |
| 3,978,847 A | 9/1976 | Fehmi et al. |
| 4,195,220 A | 3/1980 | Bristol et al. |
| 5,808,971 A | 9/1998 | Alini et al. |
| 2014/0150797 A1 | 6/2014 | Cheung |

FOREIGN PATENT DOCUMENTS

| | | |
|---|---|---|
| EP | 0729161 | 8/1996 |
| JP | 58162127 | 9/1983 |
| JP | 2004088953 | 3/2004 |
| JP | 2007291532 A * | 11/2007 |
| WO | 2012122500 | 9/2012 |

OTHER PUBLICATIONS

Corresponding International Search Report and Written opinion for PCT/GB2014/052235 dated Oct. 29, 2014. WO.

* cited by examiner

*Primary Examiner* — Adi Amrany
(74) *Attorney, Agent, or Firm* — The Belles Group, P.C.

(57) ABSTRACT

A system is disclosed for restoring a surface field potential of an electret material. An oscillator generates an oscillating output, and a power amplifier amplifies the oscillating output. A step-up transformer generates a high voltage alternating current output from the amplified oscillating output, and a polarity controller generates one of a positive pulsating output and a negative pulsating output from the high voltage alternating current output.

10 Claims, 2 Drawing Sheets

SYSTEM AND METHOD FOR ELECTRET SURFACE POTENTIAL RESTORATION BY A DIRECTIONAL PULSATING ELECTRIC FIELD

CROSS REFERENCE TO RELATED APPLICATIONS

Priority is claimed as a divisional to U.S. patent application Ser. No. 14/337,602, filed Jul. 22, 2014, which claims priority to U.S. provisional patent application No. 61/857,125, filed Jul. 22, 2013, the disclosure of which is incorporated herein by reference in its entirety.

FIELD OF THE INVENTION

The field of the present invention relates to processes for restoring the decayed surface potential of an electret insulator.

BACKGROUND OF THE INVENTION

An electret is a static DC field carrier dielectric material which has a quasi-permanent charge with a surface potential field. Because of this, an electret could also be considered as an electrostatic carrying dielectric material similar to a permanent magnet. Whereas the parameter of a permanent magnet are very stable and cannot be affected by their surrounding environmental conditions, the surface charge potential of an electret decays over time. The surface charge potential is also affected by the surrounding environment, such as humidity, the density of nearby airborne ions, and electric fields, as well as by intrinsic parameters of the electret material, such as permittivity and resistivity.

Electrets can be created by heating up dielectric material at or near its melting temperature under a strong static electric field. The terms "electret material" and "dielectric material" are therefore used interchangeably herein. Most polymers may typically serve as a suitable dielectric material. When a dielectric material is at room temperature, the internal dipole elements are generally positioned randomly may move irregularly inside the dielectric material, and the dipole elements may be moved into temporary alignment by application of a static electric field. When the static electric field is turned off, the dipole elements return to their previous random positions and irregular movements. However, when the temperature of a dielectric material is increased close to or near the melting point of the material, the high temperature enables to the irregular movements of the dipole elements to increase. The increased movement of the dipole elements, when combined with a strong external static electric field, such as one from an extra high tension (EHT) power supply, induces greater alignment between the dipole elements, so that they are more closely aligned with the polarity of the applied static electric field. When a dielectric material at such an increased temperature has been subjected to a strong external static electric field and allowed to cool down to room temperature while remaining within the external electric field, the dielectric material may retain the induced alignment between the dipole elements. As the charged dielectric electret material cools down to room temperature (about 77° F.), the external static electric field serves to maintain the positioning and alignment of the dipole elements within the material, to the point that when the material returns to room temperature, the dipole elements may substantially retain the positioning and alignment induced by the strong external static electric field. With the dipole elements inside the dielectric material now in an induced alignment, the resulting electret has a semi-permanent electrostatic bias. This process of applying a strong external static electric field to a dielectric material while holding the dielectric material at or near its melting temperature is often referred to as a "corona static charge" method (hereinafter, simply the "corona method").

At the microscopic level, the corona method induces the internal polarization of dipole elements to change from a random format into alignment along the electric field lines, theoretically forming 'strings' of sequentially aligned dipole elements. The strings stack up on top of each other, and they group together with other strings, to form a strong internal dipole electric field, which is in the opposite direction of the charging electric field, $\varepsilon_0$. The corona method also results in a surface charge forming on the dielectric material. The surface field potential, $\varepsilon_r$, for the charged electret may be expressed as:

$$\varepsilon_r = \varepsilon_{sc} - \varepsilon_{dipole} \quad (1)$$

where $\varepsilon_{sc}$ represents the field potential from charge deposited on the surface of the charged electret, and $\varepsilon_{dipole}$ represents the field potential from the internal dipole elements. In standard practice, charged electrets are often wrapped by a piece of tin foil for a period of several days in order to remove charge deposited on the surface of the charged electret, thereby driving the $\varepsilon_{sc}$ term toward zero. Following removal of the surface charge, the resultant surface field potential, $\varepsilon'_r$, for the charged electret may be expressed as:

$$\varepsilon'_r = -\varepsilon_{dipole} \quad (2)$$

As indicated above, a charged electret has a surface field potential which is not stable and is affected by the surrounding environment and the inherent properties of the dielectric material. In other words, in order for an electret material to be truly useful, the surface field potential of the electret material needs to be restored. However, in general practice, restoring the surface field potential of a decayed electret involves applying a strong external static electric field, such as from an EHT power supply, in a high temperature environment.

When the surface field potential of an electret drops down to a low potential level, for example less than 1 kV, the surface field potential generally needs to be recharged, preferably back to the original surface filed potential, so that the electret may be useful once again. To accomplish this, the corona method may be used. However, while the known corona method may be quite feasible in an industrial setting, obtaining the necessary high temperature environment for the known corona method is highly impractical in other settings, such as for domestic users. Therefore, it is desirable to have a method for restoring the surface field potential of an electret material at or near room temperature.

SUMMARY OF THE INVENTION

The present invention is directed toward a system and method for restoring the surface field potential of an electret material. Using the system and method, the surface field potential of an electret material may be performed at or near room temperature.

In a first separate aspect of the present invention, a system for restoring a surface field potential of an electret material includes: an oscillator configured to generate an oscillating output; a power amplifier configured to amplify the oscillating output; a step-up transformer configured generate a high voltage alternating current output from the amplified oscillating output; and a polarity controller configured to generate one of a positive pulsating output and a negative pulsating output from the high voltage alternating current output.

In a second separate aspect of the present invention, a method for restoring a surface field potential of an electret material includes: generating a pulsating electric output; and subjecting the electret material to the pulsating electric output for a predetermined time period.

Accordingly, an improved system and method for restoring the surface field potential of an electret material is disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

Figure 1:
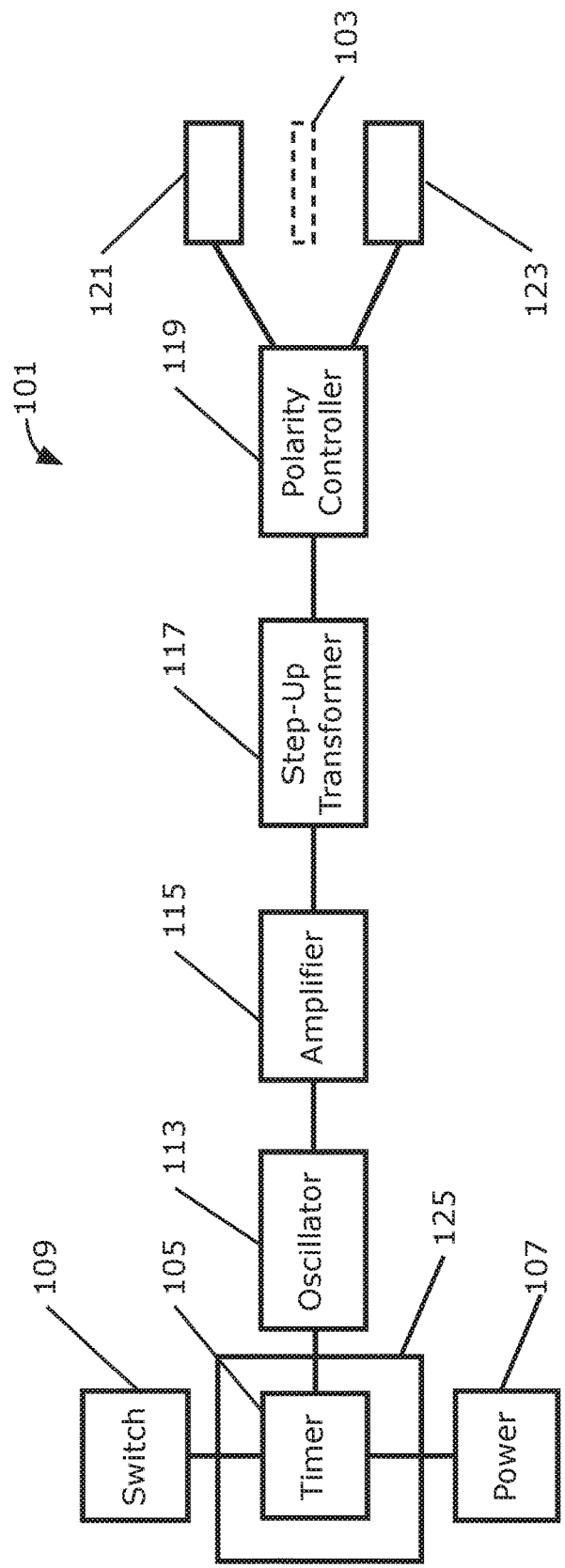
FIG. 1 is a block diagram showing a system for restoring the surface field potential of an electret material.

Turning in detail to the drawings, FIG. 1 illustrates a system 101 for restoring the surface field potential of a decayed electret material 103, with the system 101 including a plurality of circuits, each shown as separate blocks. The system 101 includes a timer 105 coupled to a power source 107 and to a switch 109. The power source 107 may be any type of external power source, or the power source 107 may be a battery. The switch 109 enables a user to activate the timer 105 so that the system 101 begins generating a pulsating electric field. The timer 105 generates a timing signal, which is output into the coupled oscillator 113. The timing signal indicates to the oscillator 113 when to start, and when to stop, generating the oscillating output. The oscillator 113 generates an oscillating output in accordance with the timing signal, ant that oscillating output is output into a power amplifier 115. The power amplifier 115 amplifies the oscillating output, and the amplified oscillating output is output to a step-up transformer 117, which may be an extra high tension (EHT) transformer. The step-up transformer 117 generates a high voltage alternating current output from the amplified oscillating signal, and that high voltage alternating current output is output a polarity controller 119. The polarity controller 119 generates either a positive pulsating output or a negative pulsating output from the high voltage alternating current output by removing, respectively, one of the negative or positive part of the high voltage alternating current output. The output of the polarity controller 119 is directed to a discharge electrode 121. The polarity controller 119 is also coupled to a ground electrode 123. The ground electrode 123 may be configured as a ground plate on which a decayed electret material may be placed. The discharge electrode 121 may be configured to have direct contact with a decayed electret material placed on the ground electrode 123, or alternatively the discharge electrode 121 may be configured to be placed above, without being in contact with, the decayed electret material.

The timer 105, as shown, is a digital timer circuit which may be a digital counter timer to better enable long duration timing control. Such a digital timer circuit enables precise timing control and command signals to signal and control both the start and stop of the oscillating signal output from the oscillator 113. When the switch 109 is actuated, electrical power from the power source 107 is applied to all circuits of the system 101, and at which point the timer 105 outputs a start indicator as part of the timing signal, with the start indicator activating the oscillator 113 to begin generating the oscillator output. The timer 105 then sends out a stop indicator as part of the timing signal, following the predetermined time period, to deactivate the oscillator 113 so that the oscillator output is no longer generated. Following the predetermined time period for restoration of surface field potential for a decayed electret material, the timer 105 may also send a command to the other circuits of the system 101 to place all circuits in a standby or idle mode.

Since the timer 105 shown in the system 101 is a digital timer circuit, the system 101 also includes shielding 125 around the timer 105 to keep the timer 105 functioning when the system 101 is operational and producing the pulsating electric field, as it has been found that digital timer circuits are generally disrupted by the pulsating electric field. As an alternative, the shielding 125 may be omitted for embodiments in which an analogue timer circuit is employed.

The oscillating output may have a sinusoidal wave form, or it may have any other type of waveform based on design choice. Where other types of wave forms are employed for the oscillating output, the wave form should be one that is suitable for the other components of the particular system. The oscillating output employed may be within a broad range of from about 10 Hz to about 50 kHz or more. The step-up transformer 117 may increase the voltage of the amplified oscillating output to 50 kV peak-to-peak or more. The timer circuit may provide a predetermined timing signal to control the operational time period of the oscillator 113 so that the system provides a pulsating electric field for a period of between about 10 minutes to 10 hours.

The system 101 may include a user interface so that the user may adjust one or more parameters associated with the system 101. The adjustable parameters may include the start/stop period of the timing signal generated by the timer 105, the frequency generated by the oscillator 113, the waveform type generated by the oscillator 113, the voltage increase provided by the step-up transformer 117, and a positive or negative polarity for the pulsating output from the polarity controller 119.

The system 101 may be used to restore the surface field potential of a decayed electret material at room temperatures of about 77° F. (25° C.). The system 101 is also expected to be able to restore the surface field potential of a decayed electret material at temperatures of about 68° F. (20° C.) through about 85° F. (30° C.). The system 101 should even be able to restore the surface field potential of a decayed electret material at temperatures of about 104° F. (40° C.), or even higher, with greater efficiencies being realized at higher temperatures.

The pulsating electric field generated by the system 101 may be used to restore the surface field potential of a decayed electret material back to the previously established surface field potential of that material at room temperature (and also within the temperature ranges discussed above). For some electret material, depending upon the settings of the system 101, the system 101 may be able to restore the surface field potential of a decayed electret material to an even higher potential at room temperature (and also within the temperature ranges discussed above).

The basic operating principle of the system 101 is to use the generated pulsating electric field to agitate and also enhance movement of internal dipole elements within a decayed electret material. At the same time, single polarity of the pulsating electric field also directs those position shifted dipole elements back to their starting, lined-up positions with polarities in series.

In a decayed electret material, the positions of internal dipole elements are shifted from their starting position to new, unaligned positions. As discussed above, the surface field potential of an electret material is at maximum when all dipole elements are aligned in a series of strings. Thus, when an electret material has a decayed surface field potential, some dipole elements are shifted away from their original aligned string positions. Since the final surface field potential is generally a vector sum voltage, when the dipole elements are shifted away from their aligned string positions, the surface field potential is much lower than when the dipole elements are aligned in their string positions. The pulsating electric field of the system 101 appears to be able to realign the dipole elements in their aligned string positions at temperatures down to and somewhat below room temperature, so that the surface field potential of the electret element may be restored. The system 101 thus provides a significant advantage over the corona method, as high temperature environments, at or near the melting point of an electret material, are not needed to restore the surface field potential of a decayed electret material.

In the following examples, Example 1 and Example 2 use a pulsating electric field to restore the surface field potential of a decayed electret material, and Comparison Example 1 uses a modified corona method, in which a decayed electret material is subjected to a static electric field in an environment of about room temperature.

Example 1

In Example 1, the electret material used was PTFE having a size of 80 mm×60 mm×1 mm. The electret material had a decayed surface field potential measured at 0.7 kV. The electret material was placed between a ground electrode and a non-contacting discharge electrode and subjected to a pulsating electric field generated by the discharge electrode. The electret material was subjected to the pulsating electric field at a temperature of about 25° C. for a time period of 5 minutes. The oscillating output was set at a sinusoidal frequency in the range of 15-30 Hz, the output of an EHT transformer was 110 kV peak-to-peak, and the polarity controller selected the positive polarity of the EHT transformer output, so that the output of the polarity controller was 55 kV peak-to-peak.

With this configuration, the electret material was subjected to the pulsating electric field for the indicated time period, after which the measured surface field potential of the electret material was 7.9 kV.

Comparison Example 1

In Comparison Example 1, the electret material used was PTFE having a size of 80 mm×60 mm×1 mm. The electret material had a decayed surface field potential measured at 0.7 kV. The electret material was placed between a ground electrode and a non-contacting discharge electrode and subjected to a pulsating electric field generated by the discharge electrode. The electret material was subjected to the pulsating electric field at a temperature of about 25° C. for a time period of 5 minutes. The static electric field was generated by a direct current voltage of 55 kV.

With this configuration, the electret material was subjected to the static electric field for the indicated time period, after which the measured surface field potential of the electret material was 1.2 kV.

Example 2

In Example 2, the electret material used was PTFE having a size of 80 mm×60 mm×1 mm. The electret material had a decayed surface field potential measured at 0.7 kV. The electret material was placed between a ground electrode and a non-contacting discharge electrode and subjected to a pulsating electric field generated by the discharge electrode. The electret material was subjected to the pulsating electric field at a temperature of about 25° C. for a time period of 5 minutes. The oscillating output was set at a sinusoidal frequency of about 35 Hz, the output of an EHT transformer was 110 kV peak-to-peak, and the polarity controller selected the positive polarity of the EHT transformer output, so that the output of the polarity controller was 55 kV peak-to-peak. The entire system of Example 2 was operated from a 3 V battery.

With this configuration, the electret material was subjected to the pulsating electric field for the indicated time period, after which the measured surface field potential of the electret material was 7.9 kV.

Figure 2:
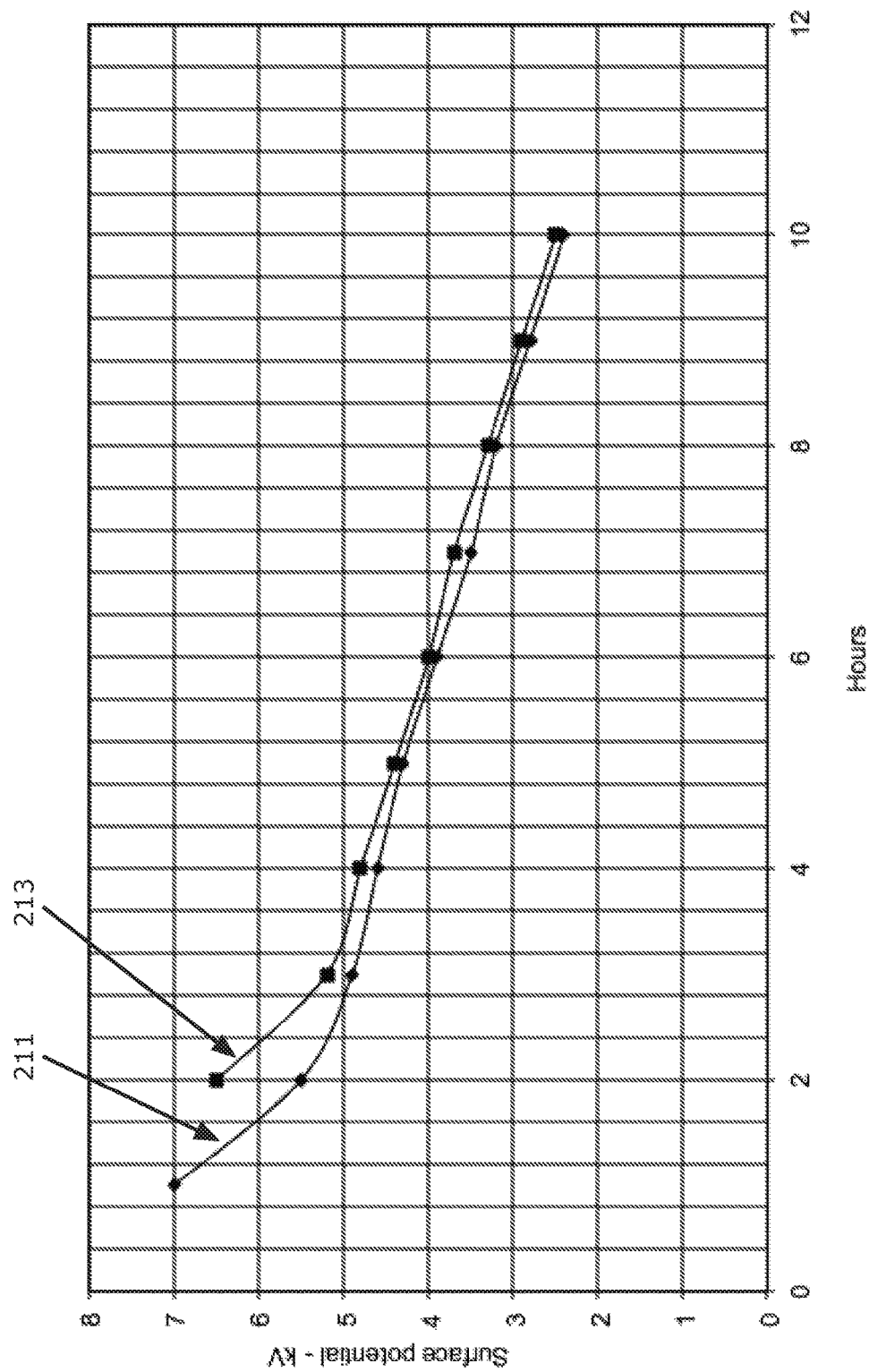
FIG. 2 is a graph showing a comparison of surface field potential decay between an electret material restored with the corona method versus an electret restored with a pulsating electric field.

FIG. 2 shows the decay curve 211 for a first electret material restored by a pulsating electric field as compared to the decay curve 213 a second electret material restored by a static electric field using the traditional corona method. Overall, the two curves are very similar, with the exception that the restored starting field potential for the first electret is somewhat higher than the restored starting field potential for the second electret material. Although the decay curves 211, 213 do not extend all the way down to a surface field potential of 2 kV, assuming 2 kV is the minimum working voltage for both the first and the second electret materials, the effective working period of the first electret is 8 hours, and the effective working period of the second electret is 9 hours. Thus, an electret material which has its surface field potential restored using a pulsating electric field is able to function nearly the same as an electret material which has its surface field potential restored using the traditional corona method.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method for restoring a surface field potential of an electret material, the method comprising:
generating an oscillating output from an oscillator;
amplifying the oscillating output of the oscillator;

coupling the amplified oscillating output into a high voltage transformer and generating a high voltage alternating current output from the amplified oscillating output;

generating a pulsating electric output from the high voltage alternating current output of the high voltage transformer using a polarity controller, wherein the pulsating electric output is one of a positive pulsating output having a positive polarity and a negative pulsating output having a negative polarity;

receiving the pulsating electric output at a discharge electrode, the discharge electrode placed in a spaced apart manner from a ground plate electrode for removably receiving the electret material therebetween;

placing the electret material between the discharge electrode and the ground plate electrode; and subjecting the electret material to the pulsating electric output for a predetermined time period.

2. The method of claim 1, wherein the pulsating electric output generates a pulsating electric field between the discharge electrode and the ground electrode.

3. The method of claim 1, wherein placing the electret material between the discharge electrode and the ground electrode includes placing the electret material in direct contact with at least one of the discharge electrode and the ground electrode.

4. The method of claim 1, wherein the high voltage transformer comprises an extra high tension (EHT) transformer.

5. The method of claim 1, wherein subjecting the electret material to the pulsating electric output includes subjecting the electret material to the pulsating electric output while the electret material is within a temperature range of about 68° F. to about 104° F.

6. The method of claim 5, wherein the temperature range is about 68° F. to about 85° F.

7. The method of claim 1, wherein the oscillating output has a frequency of about 10 Hz to about 50 kHz.

8. The method of claim 1, wherein the high voltage alternating current output has a peak-to-peak voltage of at least 50 kV.

9. The method of claim 1, wherein the predetermined time period is determined by a timing signal generated by a timer.

10. The method of claim 9, wherein the timer comprises an analogue timer circuit.

* * * * *